US012188334B1

(12) United States Patent
Couvillion et al.

(10) Patent No.: US 12,188,334 B1
(45) Date of Patent: Jan. 7, 2025

(54) MOBILE MODULAR CONTAINMENT SYSTEM

(71) Applicant: Couvillion Group, LLC, Belle Chasse, LA (US)

(72) Inventors: Timothy M. Couvillion, Belle Chasse, LA (US); Kevin Kennelley, Tequesta, FL (US); Walter Jack Couch, Cypress, TX (US)

(*) Notice: Subject to any disclaimer, the term of this patent is extended or adjusted under 35 U.S.C. 154(b) by 787 days.

(21) Appl. No.: 17/036,752

(22) Filed: Sep. 29, 2020

Related U.S. Application Data

(60) Provisional application No. 62/975,550, filed on Feb. 12, 2020, provisional application No. 62/955,953, filed on Dec. 31, 2019.

(51) Int. Cl.
  *E21B 43/01* (2006.01)
  *B01D 19/00* (2006.01)
  *E02B 15/00* (2006.01)

(52) U.S. Cl.
  CPC ...... *E21B 43/0122* (2013.01); *B01D 19/0068* (2013.01); *E02B 15/00* (2013.01); *E02B 2015/005* (2013.01)

(58) Field of Classification Search
  CPC . E21B 43/0122; B01D 19/0068; E02B 15/00; E02B 2015/005
  See application file for complete search history.

(56) References Cited

U.S. PATENT DOCUMENTS

| | | | |
|---|---|---|---|
| RE27,308 E | 3/1972 | Leonard | |
| 3,934,658 A * | 1/1976 | Nelson | E21B 15/003 175/7 |
| 9,140,104 B2 * | 9/2015 | Zung | E21B 43/0122 |
| 9,217,317 B2 | 12/2015 | Backes | |
| 2010/0038324 A1 | 2/2010 | Couch | |
| 2012/0051841 A1 * | 3/2012 | Hatton | E21B 43/0122 405/63 |
| 2012/0160509 A1 * | 6/2012 | Caldwell | E21B 43/0122 166/363 |
| 2012/0211234 A1 * | 8/2012 | Wilie | E21B 43/0175 166/345 |
| 2016/0160614 A1 * | 6/2016 | Ward | E21B 43/0122 210/170.11 |
| 2016/0265317 A1 * | 9/2016 | Vu | E02B 15/00 |
| 2019/0022560 A1 | 1/2019 | De Sorbier | |

FOREIGN PATENT DOCUMENTS

WO     81/01310     5/1981

OTHER PUBLICATIONS

Wells Fargo Deepwater & Subsea Technology Forum, Nov. 29, 2018.
Subsea Separation and Processing of Oil, Gas & Produced Water: Past, Present and Future: Why We Need It Now, Jan. 13, 2012.

\* cited by examiner

*Primary Examiner* — Youngsul Jeong
(74) *Attorney, Agent, or Firm* — Carver, Darden, Koretzky, Tessier Finn, Blossman & Areaux, LLC; Raymond G. Areaux; J. Matthew Miller, III

(57) ABSTRACT

A portable subsea pollution dome with built-in gas separator that is capable of collecting oil, or oil and gas, from a leaking production well, venting the gas and storing the oil in built-in a storage tank.

30 Claims, 17 Drawing Sheets

MOBILE MODULAR CONTAINMENT SYSTEM

REFERENCE TO RELATED APPLICATION

The instant application claims priority to U.S. provisional application Nos. 62/955,953 filed on Dec. 31, 2019 and 62/975,550 filed on Feb. 12, 2020.

FIELD OF THE INVENTION

A portable subsea pollution dome with built-in gas separator that is capable of collecting oil, or oil and gas, from a leaking production well, venting the gas and storing the oil in built-in storage tanks.

BACKGROUND OF THE INVENTION

Downed production platforms and submerged oil pipelines can become victim to uncontrolled oil and gas leaks. For example, an offshore production platform toppled by a hurricane can have multiple wells leaking oil and gas into the ocean thereby polluting the ocean and shoreline. Collection domes can be used to collect leaking oil and gas streams and a separator, attached to the collection dome, can be used to separate the gas from the oil so that the oil can be collected and safely removed.

During a pollution event, time is of the essence and it is disadvantageous to separately procure a collection dome, a separator and a storage tank, for capturing the leaking oil. Also, these components may require substantial time, and specialized equipment, to assemble before the system can be deployed to capture the leaking oil.

Thus, it is advantageous to have a portable, modular system that can be quickly and easily deployed to collect, separate and store leaking oil. Additionally, it is advantageous for the portable, modular system to be lightweight, yet durable, so that it can be used on many types of subsea surface types (both soft and rocky) and can be easily transported via trucks and assembled using the types of cranes often found at dockside facilities.

SUMMARY OF THE INVENTION

The invention comprises a mobile modular containment system comprising a guide base comprised of multiple joinable subparts wherein when said subparts are joined together, said guide base comprises multiple bell guides, a collection dome secured to said guide base and a separator secured to said collection dome.

In another aspect, the invention comprises a mobile modular containment system kit comprising a guide base comprised of multiple joinable subparts and wherein when said subparts are joined together, said guide base comprises multiple bell guides, a collection dome securable to said guide base and a separator securable to said collection dome.

DETAILED DESCRIPTION

Figure 7A:
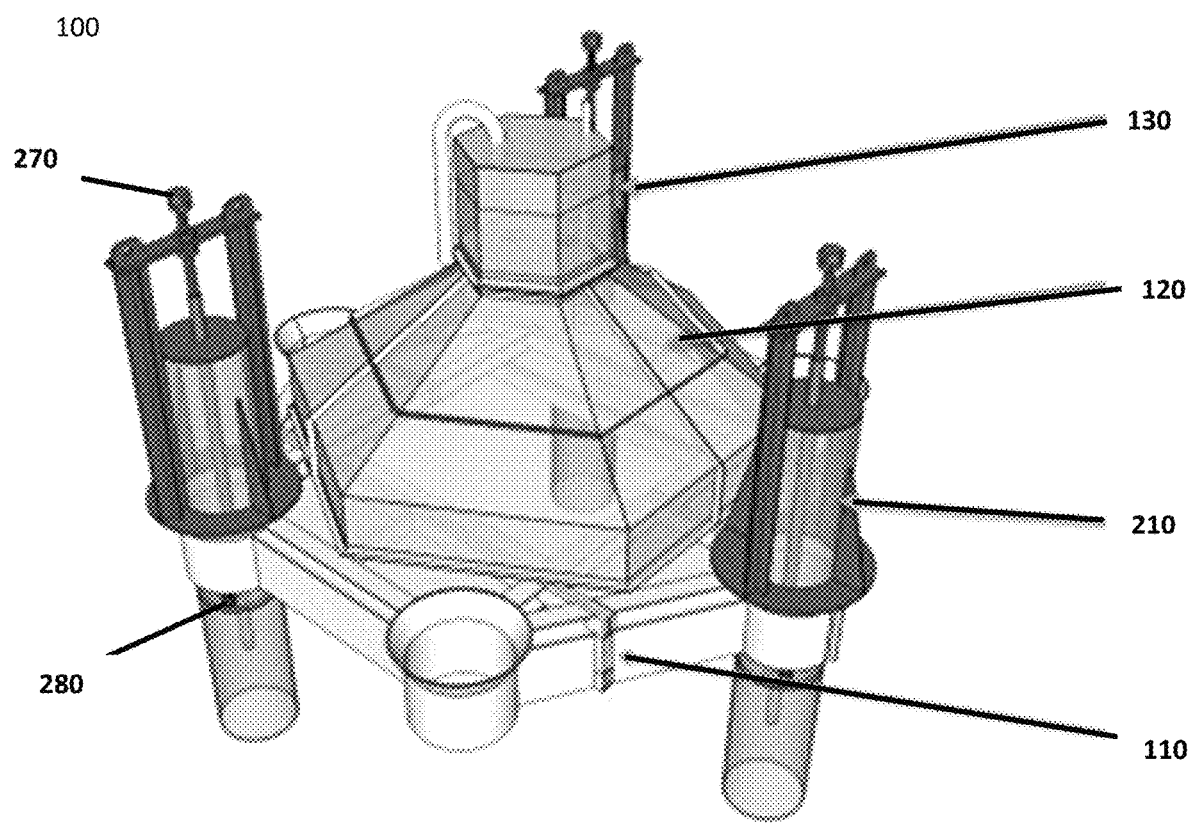
FIG. 7A shows an exemplary mobile modular containment system with the collection dome and separator installed on the guide base and a locking system used to position the system a desired height above the subsea floor. suction pile top in the extended position.

The mobile modular containment system ("MMCS") 100, as shown in FIG. 7A, is composed of three main components: the guide base 110, the collection dome 120 and the separator 130. The guide base 110 may further comprise a base plate 160 that creates a flat surface along a portion of the interior of the guide base 110. The guide base 110 may also comprise guide posts 190 for use in securing the collection dome 120 to the guide base 110.

Figure 1A:
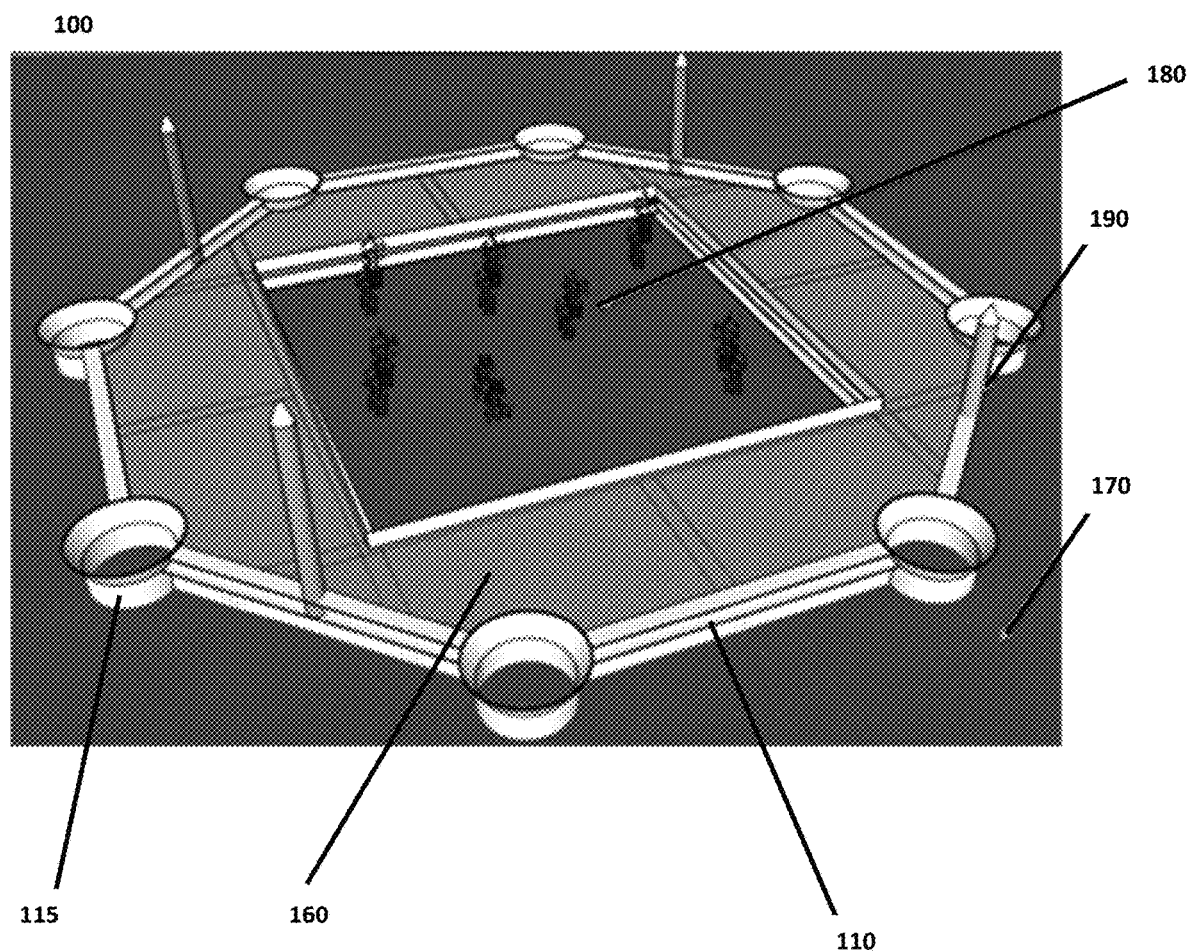
FIG. 1A shows an initial step in securing of an exemplary mobile modular containment system to a subsea floor.

FIGS. 1A-1D depict installing a MMCS 100 on a soft subsea bottom 170. The soft subsea bottom 170 will generally comprise hard mud or a sand bottom. As shown in FIG. 1A, as an initial step, the guide base 110 is placed on the soft subsea floor 170 so that the open center of the guide base 110 encloses the oil and gas plumes 180.

Figure 1B:
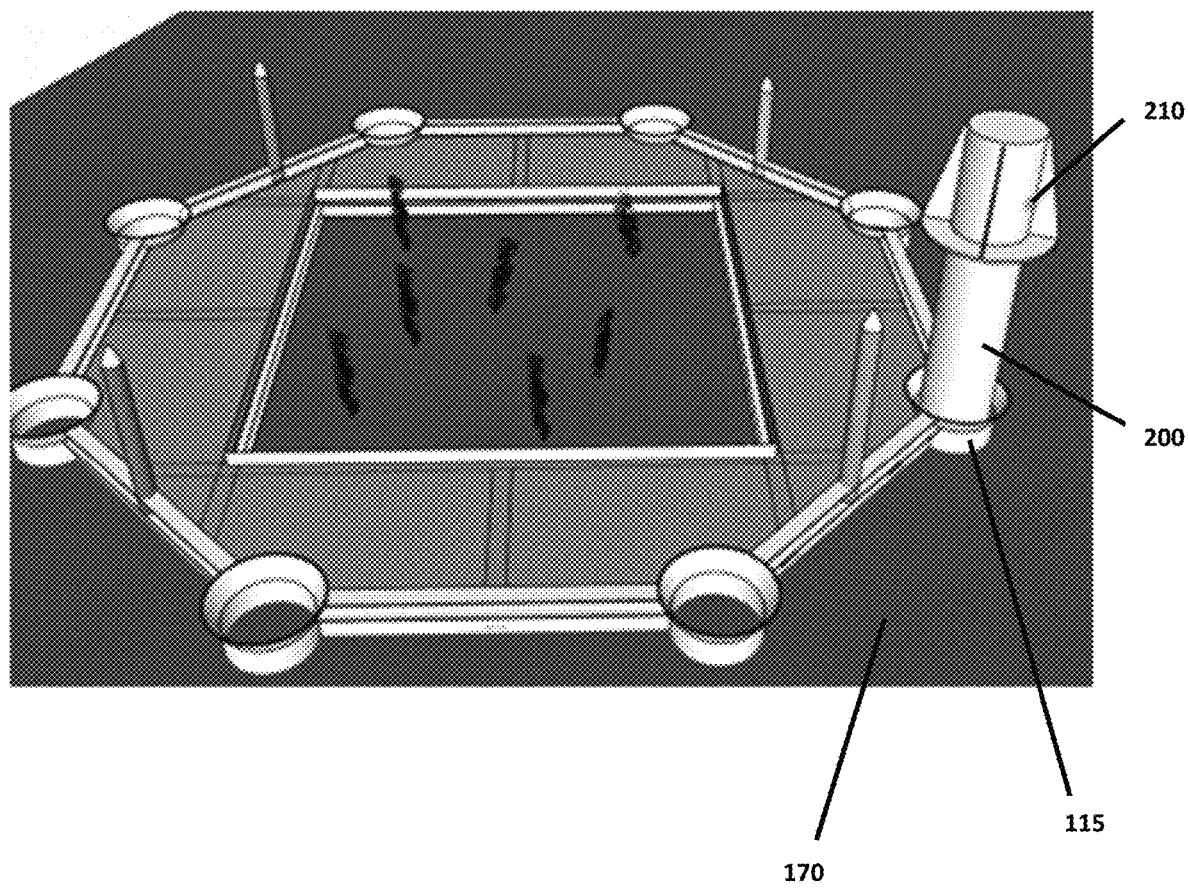
FIG. 1B shows drive piles being driven into a guide base as a subsequent step in securing an exemplary mobile modular containment system to a subsea floor.
Figure 1C:
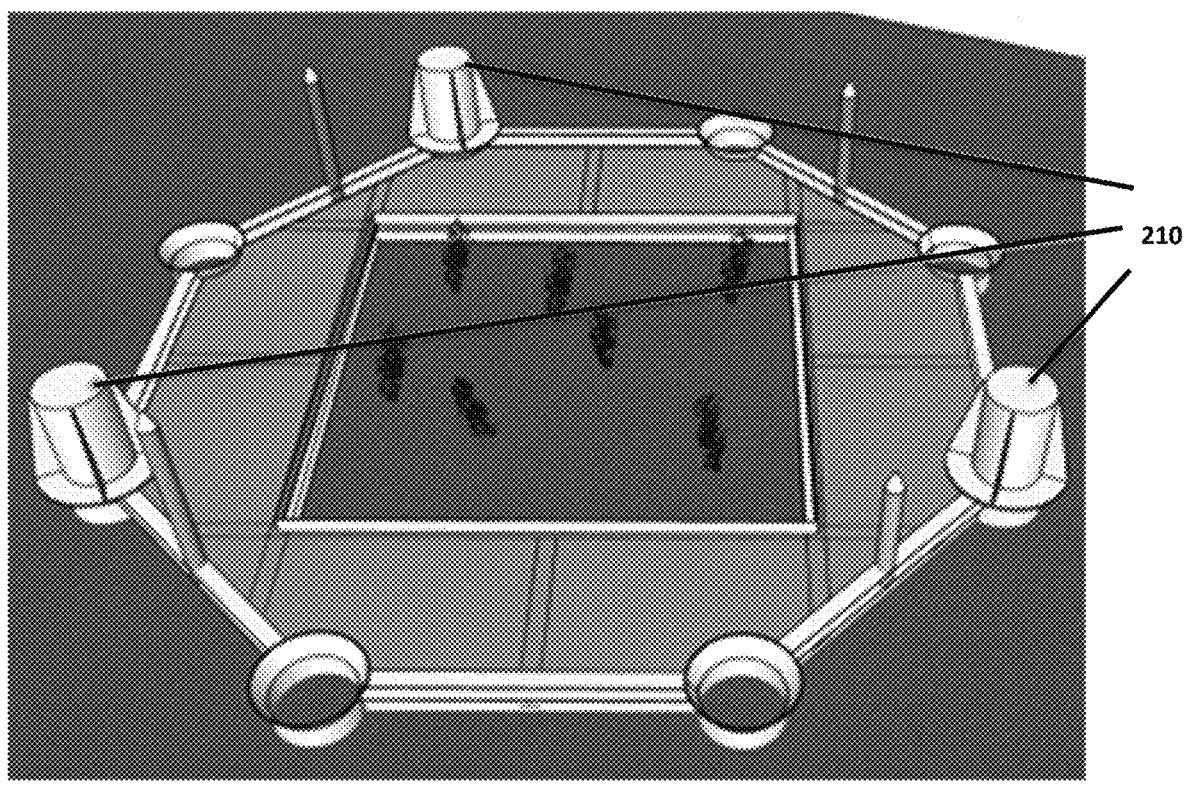
FIG. 1C shows pile caps holding the guide base in position as another subsequent step in securing an exemplary mobile modular containment system to a subsea floor.

As shown in FIG. 1B, after the guide base 110 is placed on the soft subsea floor 170, piles 200 comprising pile caps 210 are driven through bell guides 115 and into the soft subsea floor 170 to secure the guide base 110 to the soft subsea bottom 170. The guide base 110 comprises multiple bell guides 115 that may be used to receive piles 220, however, the actual number of piles 220 used will depend on the soil conditions of the soft subsea bottom 170. Generally, only three or four piles 220 will be utilized. Thus, the additional bell guides 115 provide flexibility to install a pile 115 in another location if debris is encountered during the pile 200 installation, thereby avoiding having to relocate the entire MMCS 100 if debris is encountered. As shown in FIG. 1C, the piles 200 are driven downward through the soft subsea bottom 170 until the pile caps 210 contact the bell guides 115 thereby securing the guide base 110 in position.

Figure 7B:
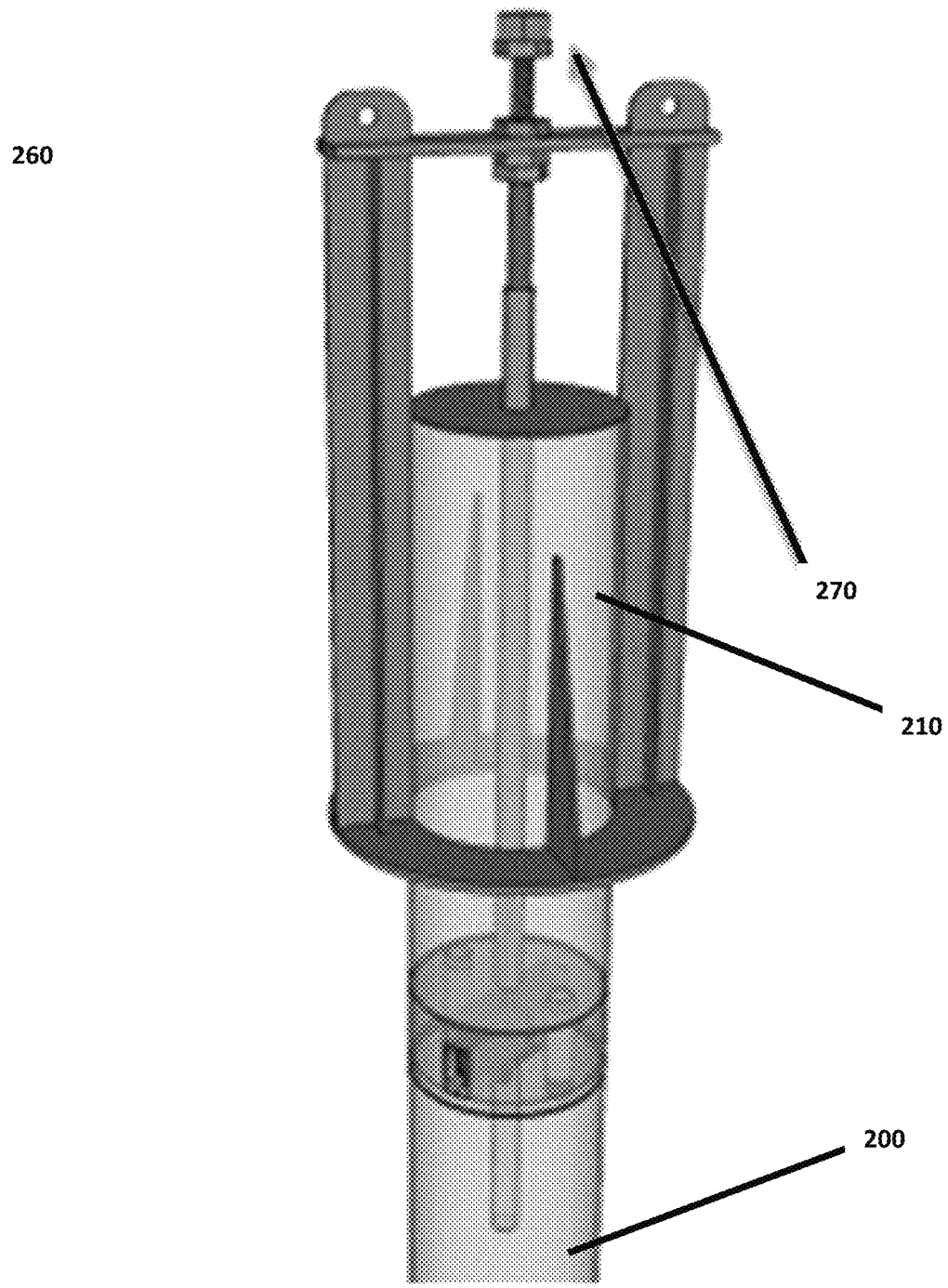
FIG. 7B shows the jack screws of the locking system in the retracted position.
Figure 7C:
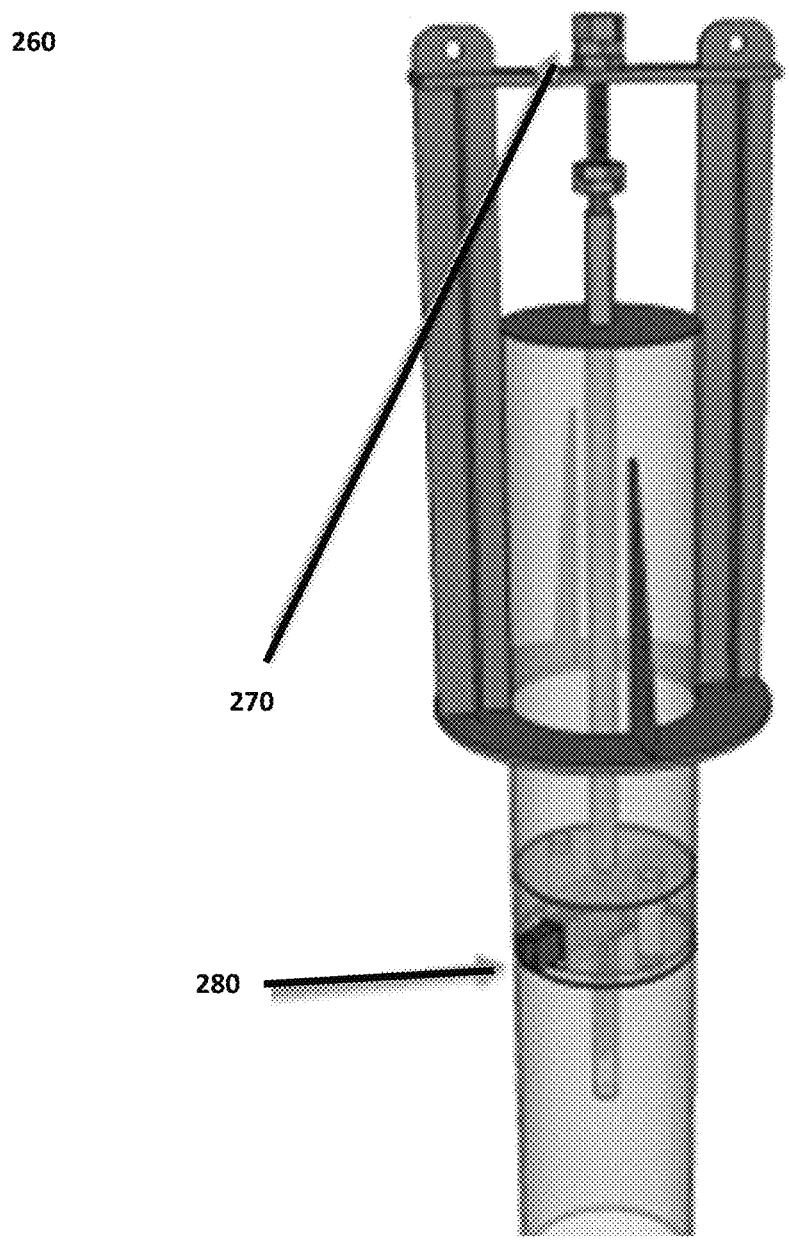
FIG. 7C shows the jack screws of the locking system in the extended position.

FIGS. 7A-C depict an alternate method of securing the guide base 110 to the piles 200. In this embodiment, each pile cap 210 comprises a jack screw 270 that is capable of extending support bracing 280 to hold the guide base 110 a desired height off the subsea floor. As shown in FIG. 7A, the piles 200 are driven so that a length of each pile 200 is above the subsea floor. These piles 200 also comprise extendable support bracing 280 upon which the guide base 110 can rest. As shown in FIGS. 7B and 7C, the support bracings 280 are extendable using jack screws 270 located at the top of the pile caps 210. The support bracings 280 are retracted during installation of the piles 200 and extended after pile 200 installation in the guide base 110.

Figure 9A:
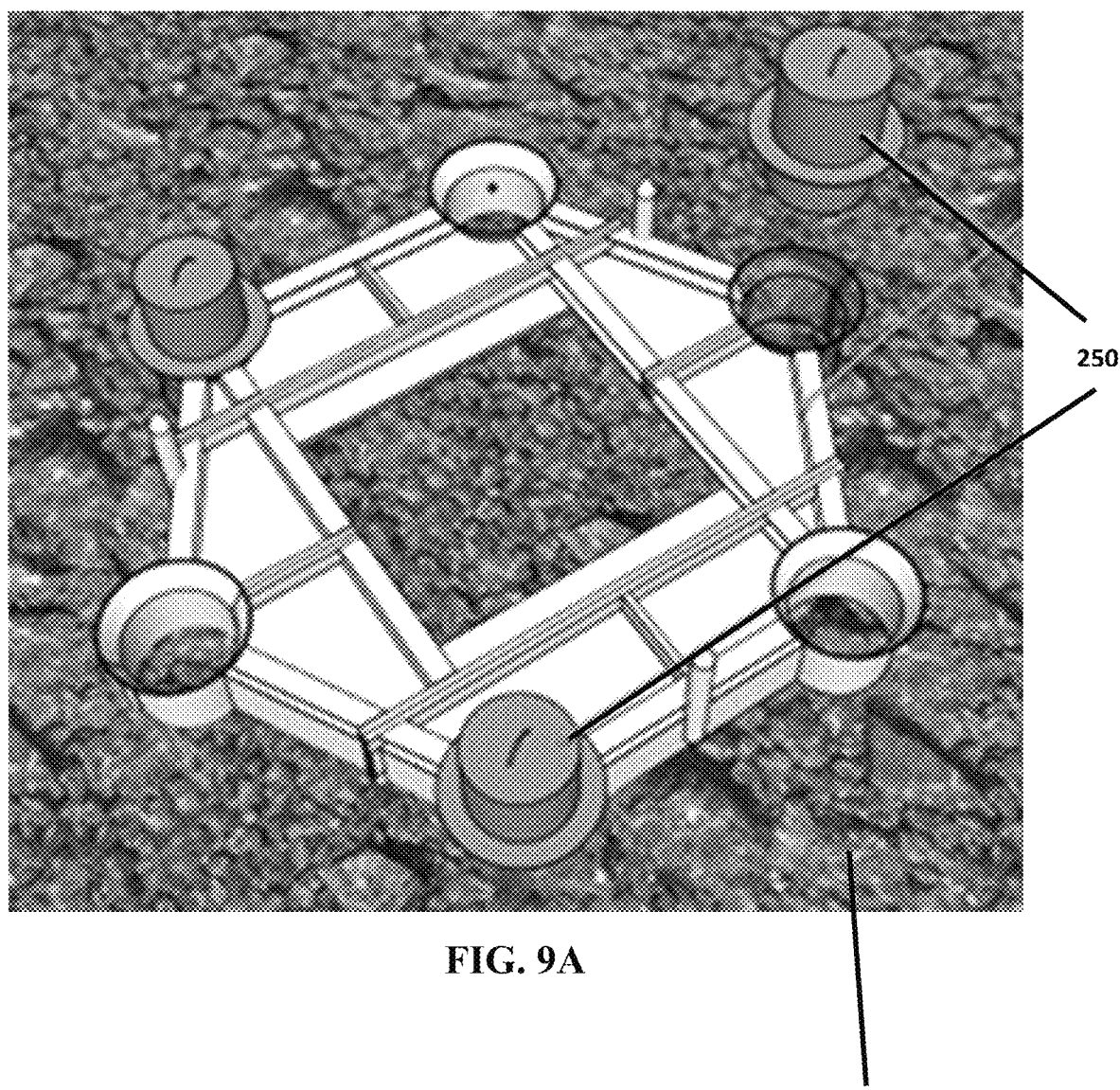
FIG. 9A shows an exemplary mobile modular containment system being secured to rocky subsea floor.
Figure 9B:
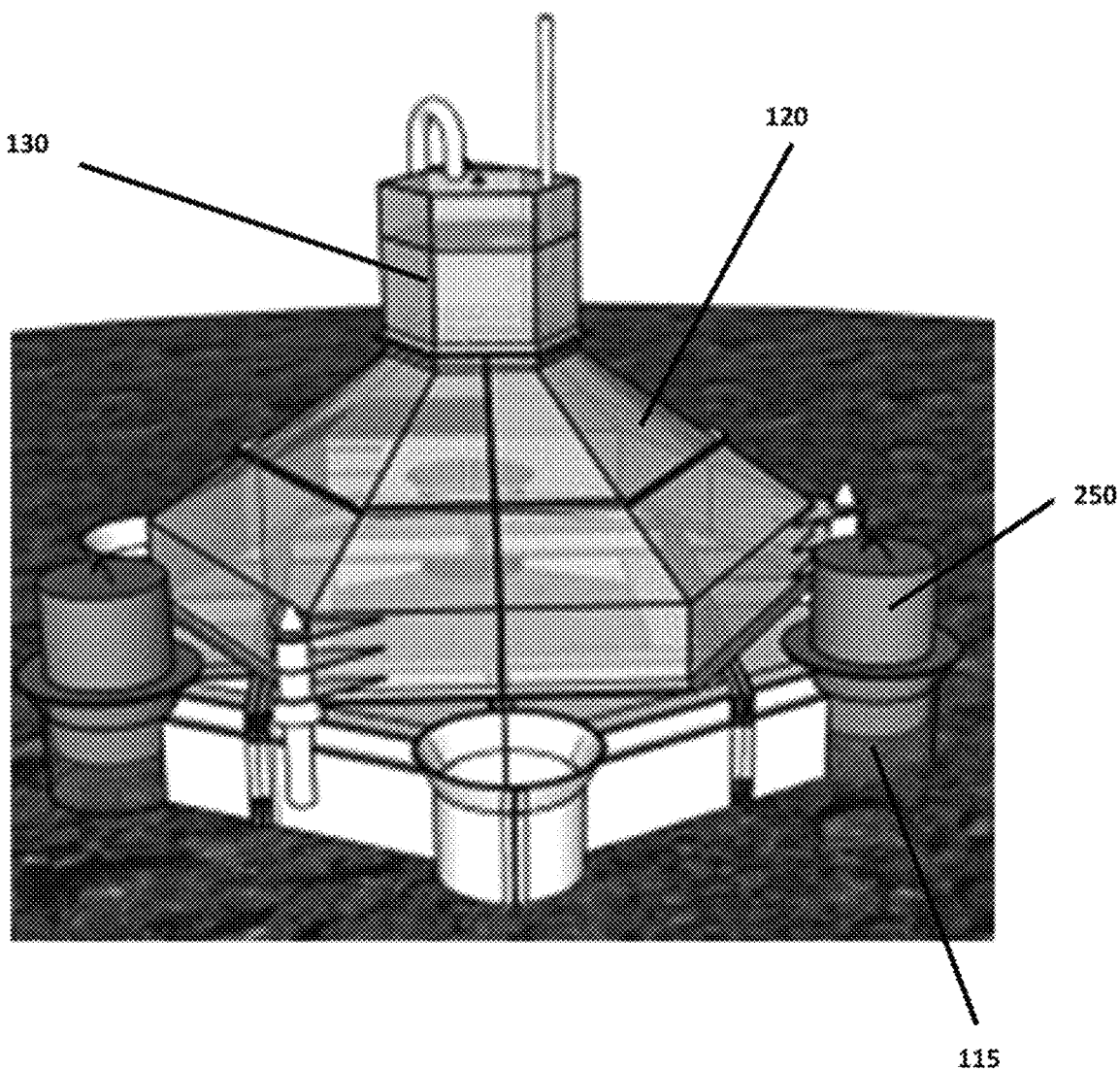
FIG. 9B shows an exemplary mobile modular containment system, with the containment dome and separator secured to the guide base, secured to a rocky subsea floor.

When the subsea floor does not permit piles 200 to be driven into it—these subsea bottoms often referred to as rocky subsea bottoms 240—bell guide weights 250 may be used to secure the guide base 110 to the rocky subsea bottom 240. FIGS. 9A and 9B show heavy bell guide weights 250 placed within the bell guides 115. The number and weight of the guide weights 250 will depend on the environmental conditions.

Figure 1D:
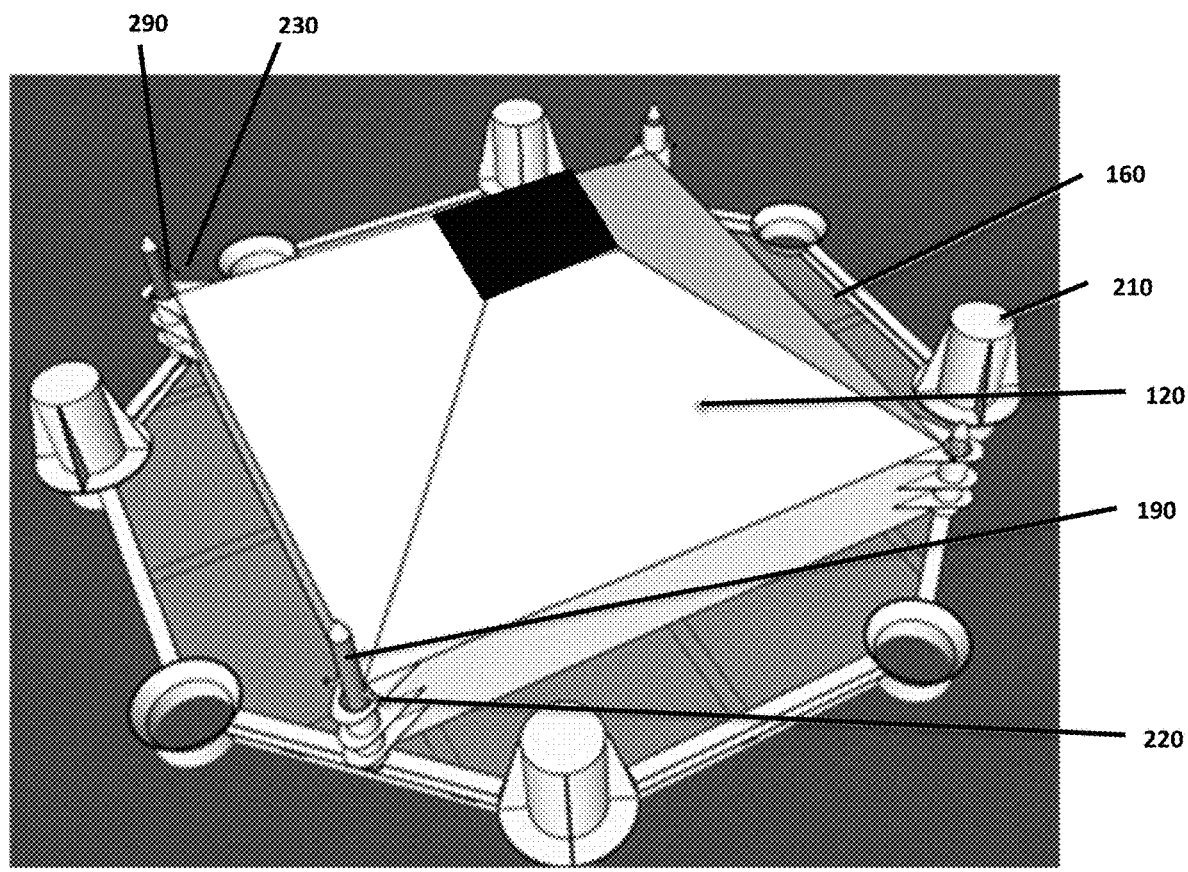
FIG. 1D shows the installation of the collection dome secured to an exemplary mobile modular containment system secured to a subsea floor.
Figure 6:
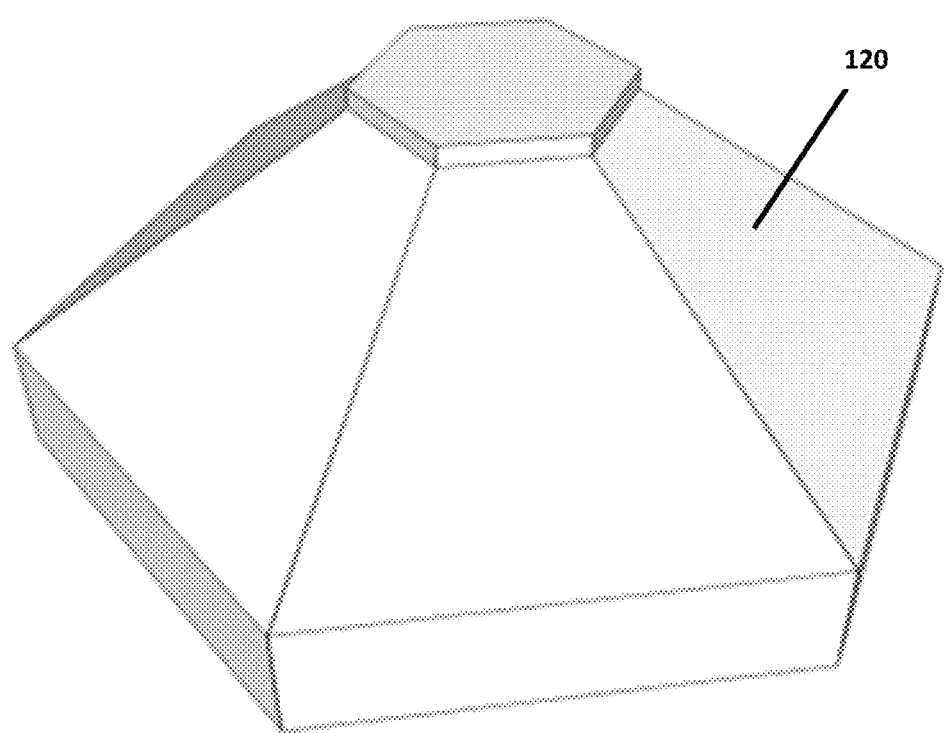
FIG. 6 shows a collection dome of an exemplary mobile modular containment system.
Figure 8A:
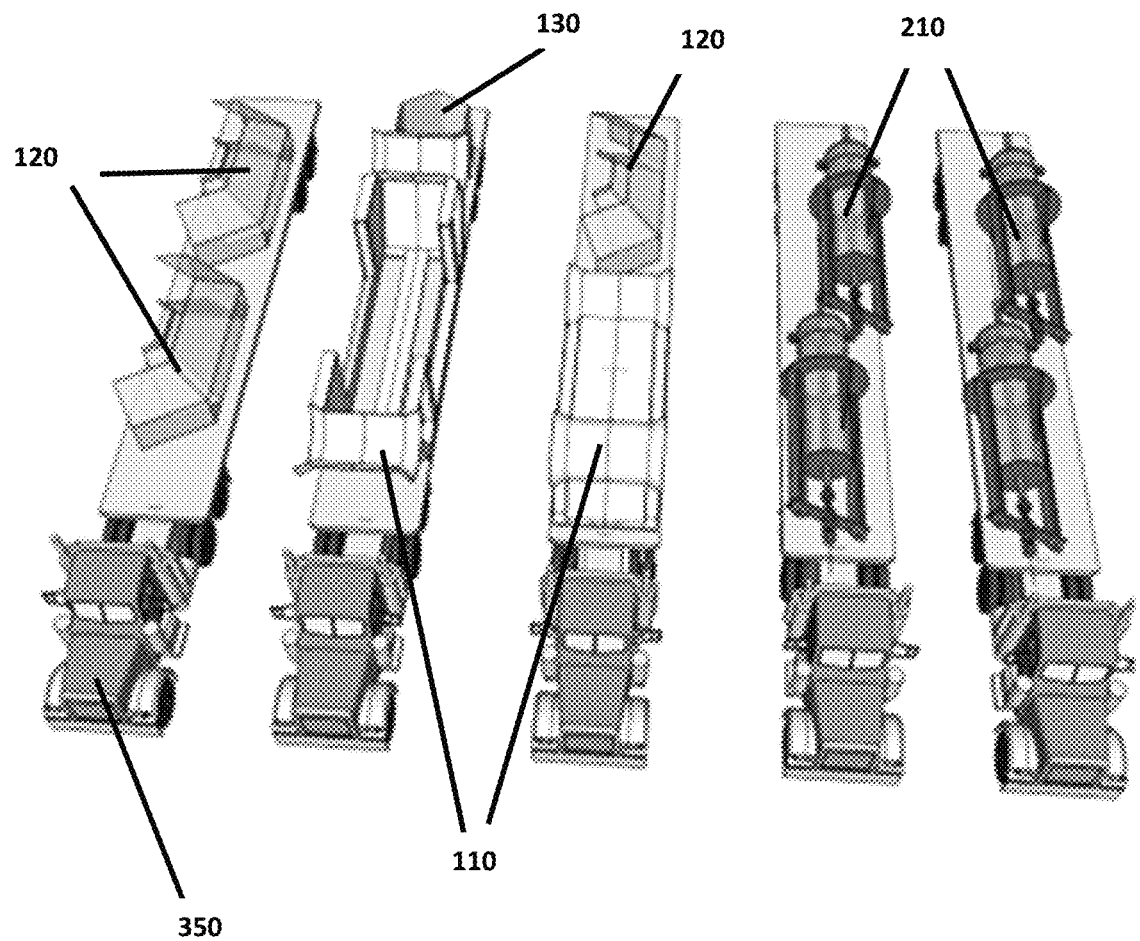
FIG. 8A shows the components of an exemplary mobile modular containment system loaded on trucks for delivery.
Figure 8B:
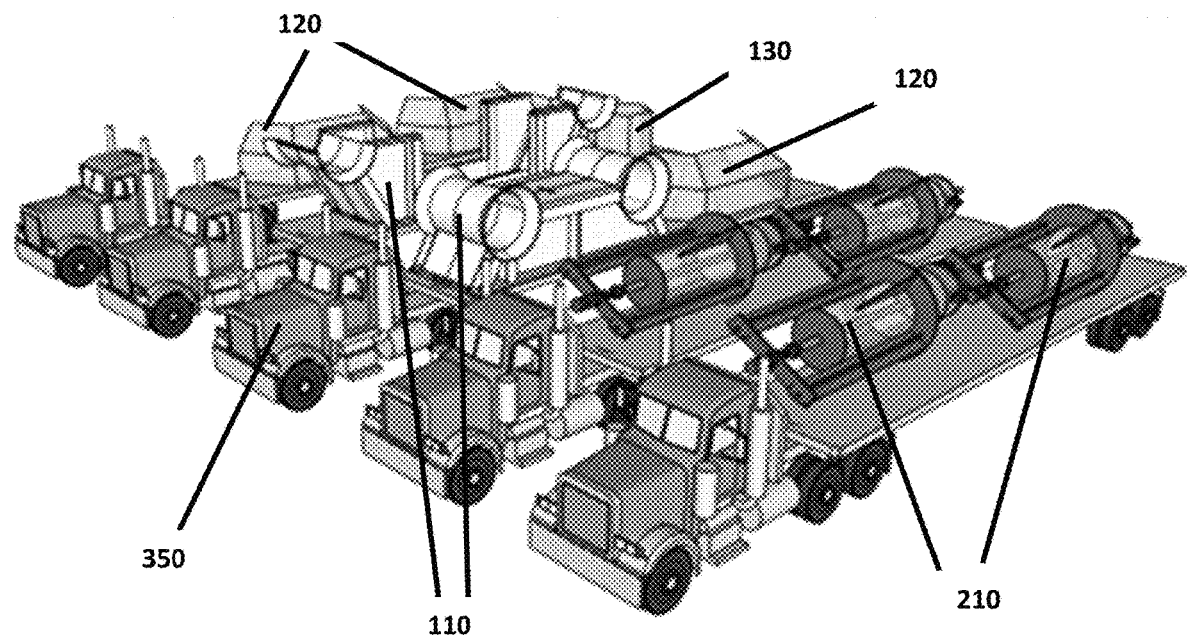
FIG. 8B is an alternate view of the components of an exemplary mobile modular containment system loaded on trucks for delivery.

FIG. 1D shows the installation of the collection dome 120 and separator 130 of the MMCS 100 and a planar view of an exemplary collection dome 120 is shown in FIG. 6. FIG. 1D does not show the separator 130 attached to the collection dome 120, however, in practice the separator 130 would be secured, via welding or other appropriate attachment means, to the collection dome 120 before the collection dome 120 is secured to the guide base 110. Also, as shown in FIGS. 8A and 8B, for ease of convenience, the collection dome 120 may be comprised of multiple subparts that are joinable via welding or other known attachment means.

The collection dome 120 may be of varying shapes and sizes depending on the environmental conditions. As shown in FIGS. 1D and 8, in one embodiment the collection dome 120 takes the general shape of hexagonal pyramid and is capable of storing 404 barrels of oil. The top of the pyramidal collection dome 120 is open to allow oil and/or gas to flow into the separator 130 attached to the top of the collection dome 120, as shown in FIG. 7A.

The collection dome of FIG. 1D further comprises post holes 220 at each corner of the collection dome 120. The collection dome 120 is placed so that the guide posts 190 slide through the post holes 220. A guide pin 230 is then placed in each guide post 190 above the post holes 220, thereby holding the collection dome 120 in place. The guide pins 230 may be tapered in shape for ease of installation and removal.

The separator 130 located above the collection dome 120 is used to vent gas that is collected by the MMCS 100. An exemplary separator 130 is disclosed in U.S. patent application Ser. No. 12/538,226 to Couch and entitled, "System and Method for Underwater Oil and Gas Separator". The separator 130 is fed from the top of the collection dome 120 wherein, due to the density differences between oil/gas and water, the oil/gas will naturally rise and flow into the separator 130 while displacing water. The separator 130 then vents the gas from the top of the separator 130 while permitting the oil (substantially free of gas) to remain in the collection dome 120 and/or the bottom of the separator 130.

Figure 10:
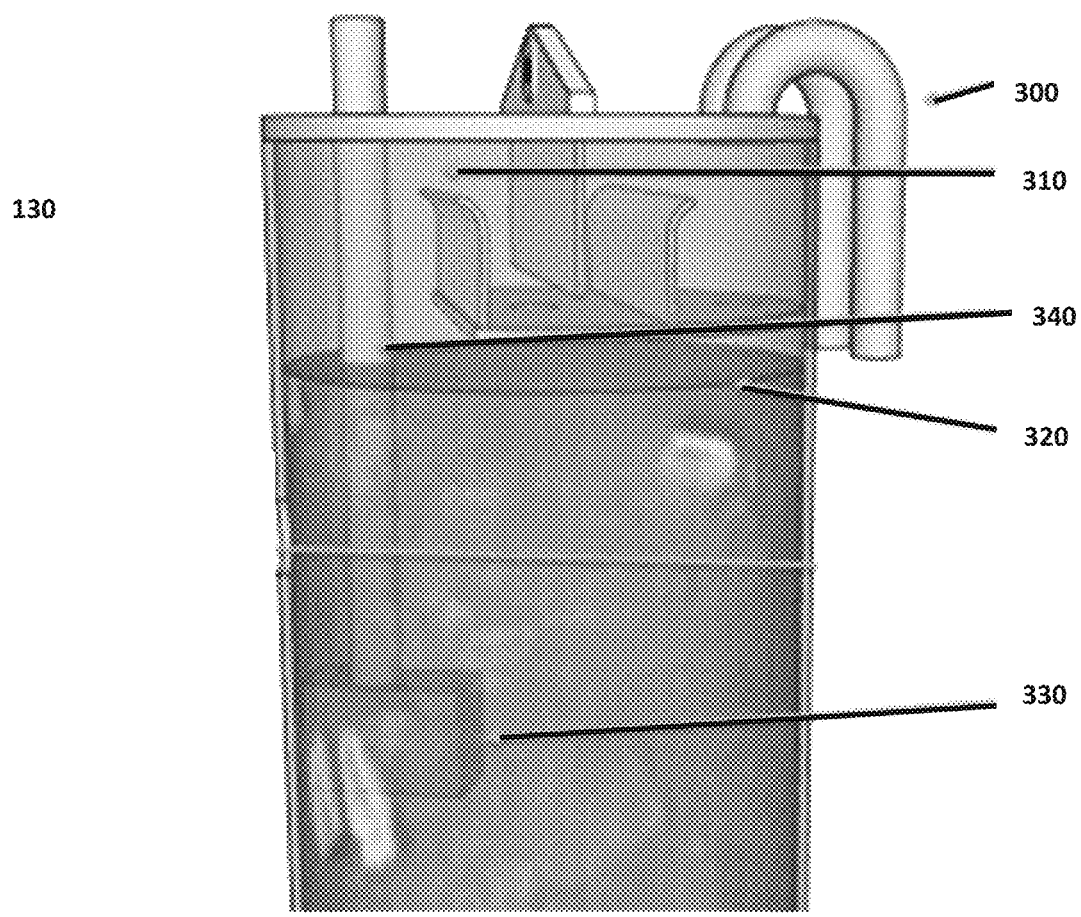
FIG. 10 shows an interior view of one configuration of a separator.

FIG. 10 depicts the interior components of an exemplary separator 130. As can be seen in FIG. 10, the oil 320 and gas 310 rises into the bottom of the separator 130 from the collection dome 120 and wherein due to the density differences of gas 310 and oil 320, the gas 310 rises to the top of the separator 320 and vented out of the separator 130 via the gas exhaust 300. The separator 130 also comprises an oil export outlet pipe 340 that is used to remove the collected oil 320 from the MMCS 100. Additionally, at the bottom of the oil export outlet pipe 340 there may be a gas and debris shield 330 that prevents gas and debris from entering the oil export outlet pipe 340.

One feature of the present invention it its unique guide base design that permits the MMCS 100 to be relatively light-weight, portable and securable to the subsea bottom. As shown in FIG. 5, in one embodiment, the guide base 110 is hexagonal in shape with six pile bell guides 115 located at each corner of the hexagonal guide base 110. The pile bell guides 115 are generally cylindrical in shape with the top of the cylinder flaring outward. The guide base 110 may be made up of multiple subparts, that are joinable by welding, bolting or other known attachment means, for ease of portability. As shown in FIGS. 2-5, in one embodiment, the guide base 110 is comprised of four subparts: a right end section 111 secured to a right center section 112 which is secured to a left center section 113 which is secured to a left end section 114. The four subparts 111, 112, 113, 114 may be bolted, welded or otherwise secured together at a location close to the pollution event.

Figure 2:
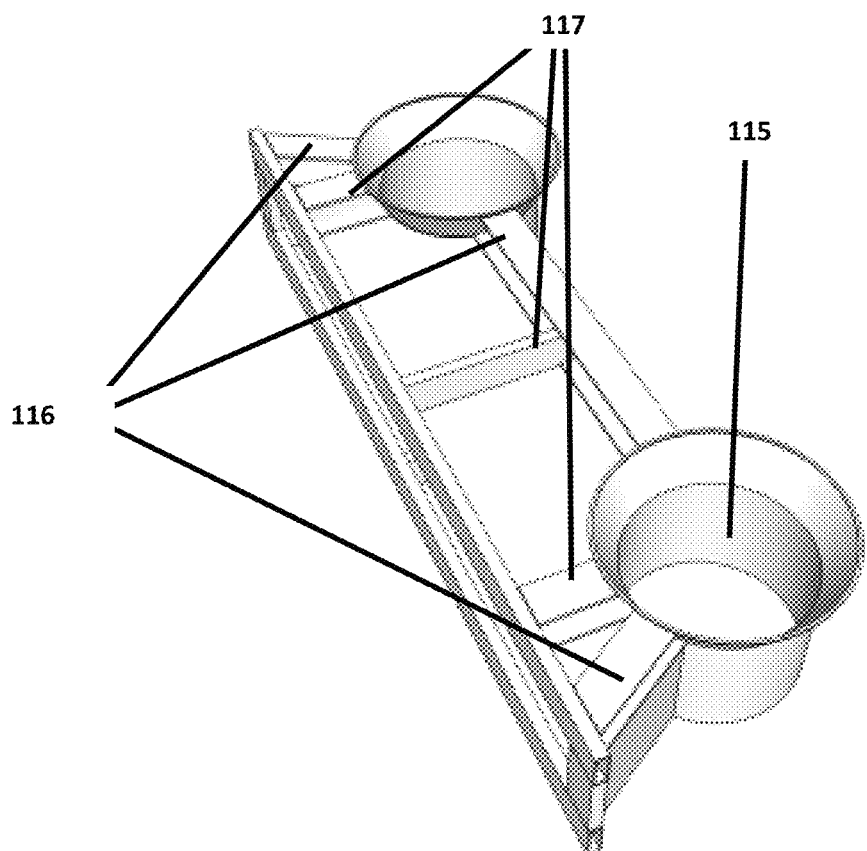
FIG. 2 shows a right end section of a guide base of an exemplary mobile modular containment system.

As shown in FIG. 2, the right end section 111 is trapezoidal in shape, having four end sides 116, with a pile bell guide 115 located at each end of the shorter of the parallel end sides 116. In addition to the four end sides 116 of the trapezoidal shaped right end section 111, the right end section 111 may further comprise one or more end supports 117 connecting certain of the four end sides 116 and which provide additional strength and stability to the guide base 110. As shown in FIG. 5, the left end section 114 is identical to the right end section 111.

Figure 3:
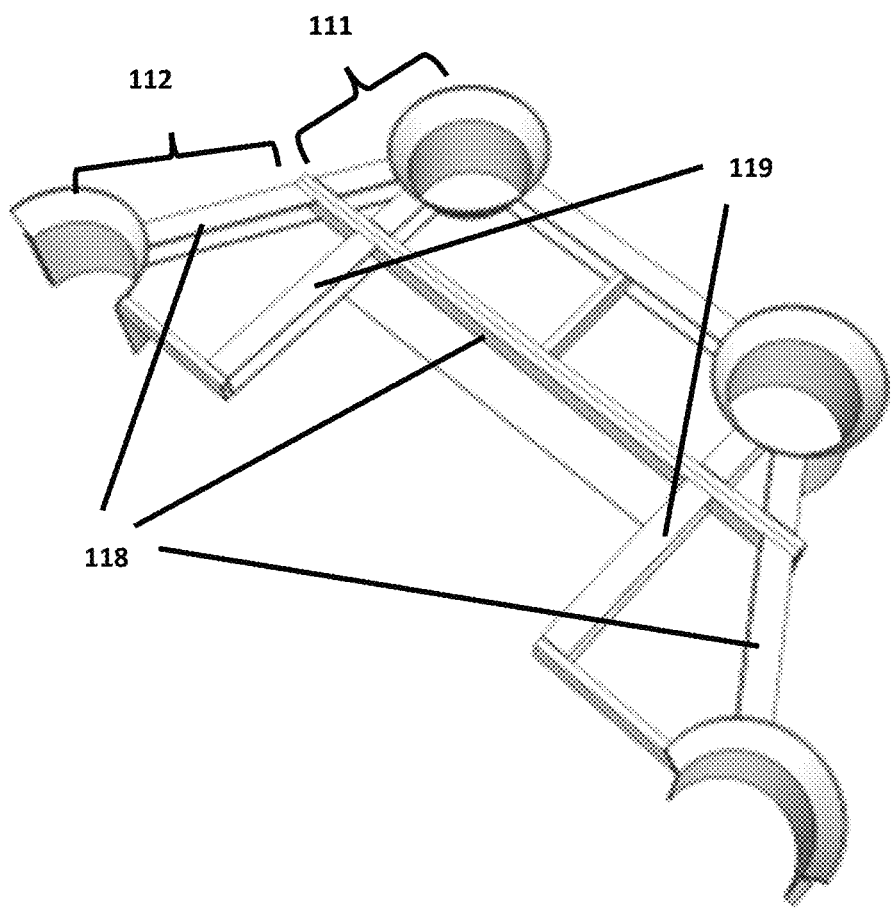
FIG. 3 shows a right end section secured to a right center section of a guide base of an exemplary mobile modular containment system.
Figure 4:
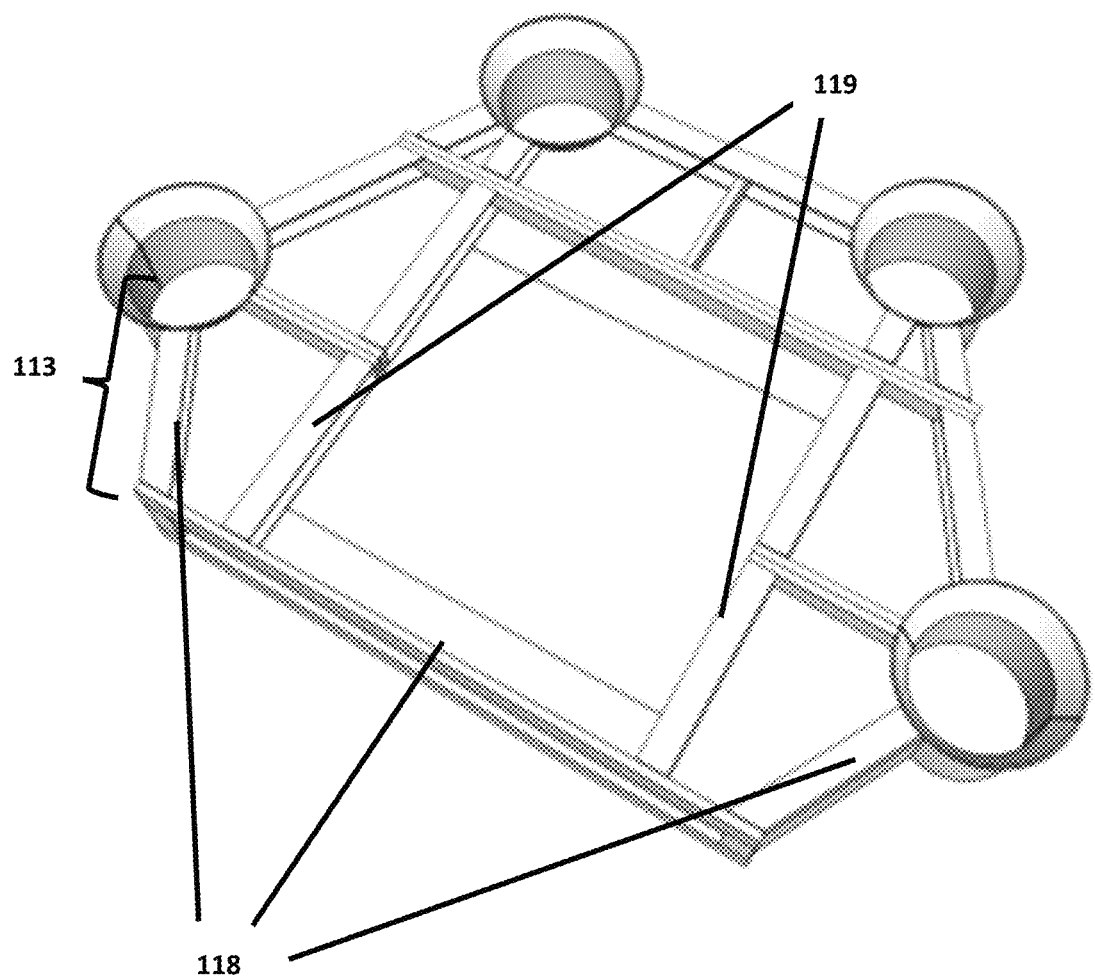
FIG. 4 shows a right end section secured to a right center section secured to a left center section of a guide base of an exemplary mobile modular containment system.
Figure 5:
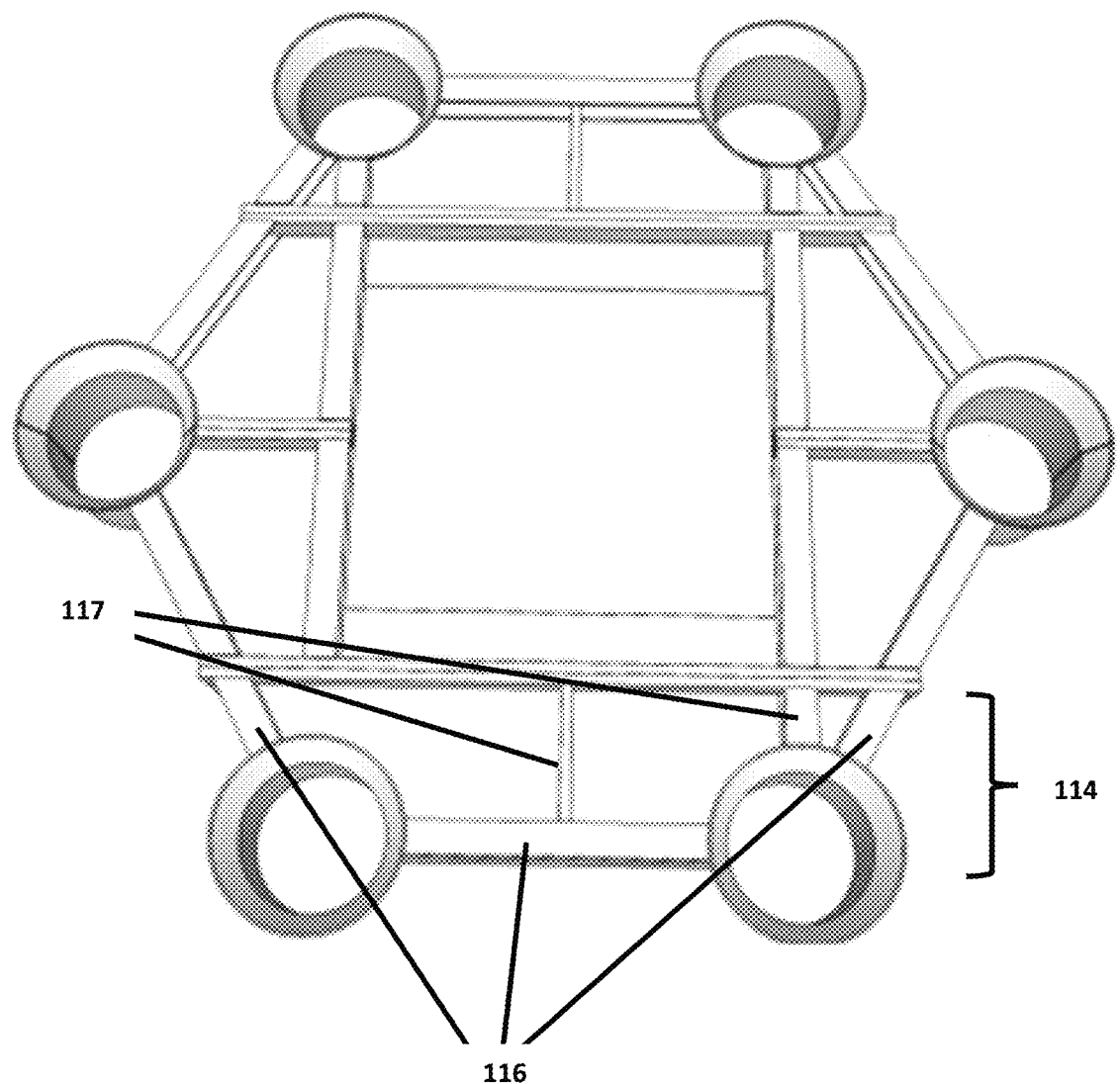
FIG. 5 shows an assembled guide base of an exemplary mobile modular containment system comprising a right end section, a right center section, a left center section and a left end section.

FIG. 3 shows a right center section 112 connected to the right end section 111 and FIG. 4 shows the left center section 113 connected to the right center section 112. The right center section 112 and the left center section 113 of the guide base 110 are identical and also generally trapezoidal in shape. Each of the left and right center sections 112, 113 comprise three center sides 118 and when secured together create a hexagon shape. Each of the left and right center sections 112, 113 also comprise two halves of a pile bell guide 115 so that when the left and right center sections 112, 113 are joined together, they form two pile bell guides 115 located on each side of an axis of the hexagon. Each of the left and right center sections 112, 113 also comprise center supports 119 connecting certain of the center sides 118 and which provide additional strength and stability to the guide base 110.

One benefit of the present invention is the portability of the MMCS 100. The MMCS 100 is designed so that the components of the MMCS 100 can be transported via truck without over height, over width or over weight permits, which can limit the ability to move components rapidly. As shown in FIGS. 8A and 8B, in one embodiment of the MMCS 100, the entire system can be transported using five trucks 350: three trucks transporting the guide base 110, collection dome 120) and separator 130 and additional trucks for transporting the pile caps 210, if needed.

Another benefit of the present invention is comparatively light weight of the MMCS 100 components. In one embodiment of the present invention, the components are light enough to be trucked without an over weight permit and so the components may be moved and handled by a 10 ton or larger cherry picker, which are generally available at dock side facilities and/or fabrication yards. In one embodiment of the present invention, the individual components are all less than 10,000 lbs.

Yet another benefit of the present invention is its durability. In one embodiment, the various components are comprised of heavy wall steel. The design of the various MMCS 100 components are to be based on API RP 2A to 100 year storm criteria, to ensure that the components can withstand the dynamic loads of installation. Additionally, the components may comprise an epoxy coating to help ensure a long life while stored.

What is claimed is:

1. A mobile modular containment system comprising:
   a guide base comprised of multiple joinable subparts and wherein when said subparts are joined together, said guide base comprises multiple bell guides;
   a collection dome secured to said guide base; and
   a separator secured to said collection dome;
   wherein said mobile modular containment system is configured so that said guide base is held at a height off a seafloor.

2. The mobile modular containment system of claim 1, wherein:
   said guide base further comprises guide posts and said collection dome comprises post holes wherein said guide posts are capable of sliding inside said post holes.

3. The mobile modular containment system of claim 2, wherein:
   said guide posts each comprise at least one guide pin hole capable of receiving a guide pin.

4. The mobile modular containment system of claim 1, further comprising:
   at least three piles wherein when installed a portion of said piles are located inside of said bell guides and a portion of said piles are embedded within a subsea floor, and wherein each of said piles further comprises a pile cap.

5. The mobile modular containment system of claim 4, wherein:
   each of said piles further comprises an extendable support bracing and each of said pile caps further comprises a jack screw wherein engagement of said jack screw results in extension of said support bracing;
   further wherein said extension of said support bracing increases said height above said seafloor.

6. The mobile modular containment system of claim 1, further comprising:
   at least three bell guide weights wherein said bell guide weights rest upon the top of said bell guides.

7. The mobile modular containment system of claim 1, wherein said mobile modular containment system is configured to allow oil and gas to flow from said seafloor into said collection dome.

8. A mobile modular containment system kit comprising:
   a guide base comprised of multiple joinable subparts and wherein when said subparts are joined together, said guide base comprises multiple bell guides;
   a collection dome securable to said guide base; and
   a separator securable to said collection dome;
   wherein said guide base is capable of being lowered onto and removably secured to three to six seafloor-secured piles, by each of said piles passing through a respective one of said multiple bell guides.

9. The mobile modular containment system kit of claim 8, further comprising at least three pile caps.

10. The mobile modular containment system kit of claim 9, wherein said guide base subparts, said collection dome, said separator, and said pile caps are capable of being transported using one or more trucks without over height, over width or over weight permits.

11. The mobile modular containment system kit of claim 8, further comprising at least three bell guide weights.

12. The mobile modular containment system kit of claim 11, wherein said guide base subparts, said collection dome, said separator, said pile caps are capable of being transported using one or more trucks without over height, over width or over weight permits.

13. The mobile modular containment system kit of claim 8, wherein said guide base further comprises guide posts and said collection dome comprises post holes wherein said guide posts are capable of sliding inside said post holes; and said guide posts further each comprise at least one guide pin hole capable of receiving a guide pin.

14. The mobile modular containment system kit of claim 8, wherein said guide base is hexagonal in shape and comprised of four subparts securable together to form said guide base.

15. The mobile modular containment system kit of claim 14, wherein said guide base comprises a square opening located in the center of said guide base.

16. A mobile modular containment system comprising:
   a guide base comprised of multiple joinable subparts and wherein when said subparts are joined together, said guide base comprises multiple pile-receiving guides;
   a collection dome secured to said guide base; and
   a separator secured to said collection dome;
   wherein said mobile modular containment system is configured so that said guide base is held at a height off a seafloor.

17. The mobile modular containment system of claim 16, wherein;
   said guide base further comprises guide posts and said collection dome comprises post holes wherein said guide posts are capable of sliding inside said post holes.

18. The mobile modular containment system of claim 17, wherein:
   said guide posts each comprise at least one guide pin hole capable of receiving a guide pin.

19. The mobile modular containment system of claim 16, further comprising:
   at least three piles wherein when installed a portion of said piles are located inside of said pile-receiving guides and a portion of said piles are embedded within a subsea floor, and wherein each of said piles further comprises a pile cap.

20. The mobile modular containment system of claim 19, wherein:
   each of said piles further comprises an extendable support bracing and each of said pile caps further comprises a jack screw wherein engagement of said jack screw results in extension of said support bracing;
   further wherein said extension of said support bracing increases said height above said seafloor.

21. The mobile modular containment system of claim 16, further comprising:
   at least 3 weights wherein said weights rest upon the top of said pile-receiving guides.

22. The mobile modular containment system of claim 16, wherein said mobile modular containment system is configured to allow oil and gas to flow from said seafloor into said collection dome.

23. A mobile modular containment system kit comprising:
a guide base comprised of multiple joinable subparts and wherein when said subparts are joined together, said guide base comprises multiple pile-receiving guides;
a collection dome securable to said guide base; and
a separator securable to said collection dome;
wherein said guide base is capable of being lowered onto and removably secured to three to six seafloor-secured piles, by each of said piles passing through a respective one of said multiple pile-receiving guides.

24. The mobile modular containment system kit of claim 23, further comprising at least three pile caps.

25. The mobile modular containment system kit of claim 24, wherein said guide base subparts, said collection dome, said separator, and said pile caps are capable of being transported using one or more trucks without over height, over width or over weight permits.

26. The mobile modular containment system kit of claim 23, further comprising at least three pile-receiving guide weights.

27. The mobile modular containment system kit of claim 26, wherein said guide base subparts, said collection dome, said separator, said pile caps are capable of being transported using one or more trucks without over height, over width or over weight permits.

28. The mobile modular containment system kit of claim 23, wherein said guide base further comprises guide posts and said collection dome comprises post holes wherein said guide posts are capable of sliding inside said post holes; and said guide posts further each comprise at least one guide pin hole capable of receiving a guide pin.

29. The mobile modular containment system kit of claim 23, wherein said guide base is hexagonal in shape and comprised of four subparts securable together to form said guide base.

30. The mobile modular containment system kit of claim 29, wherein said guide base comprises a square opening located in the center of said guide base.

* * * * *